Patented June 20, 1939

2,163,181

UNITED STATES PATENT OFFICE 2,163,181

PROCESS OF PRODUCING HALOGEN-ALKYL AMINES OR THEIR SALTS

Heinrich Ulrich and Ernst Ploetz, Ludwigshafen-on-the-Rhine, and Max Bögemann, Cologne-Muhlheim, Germany, assignors to I. G. Farbenindustrie Aktiengesellschaft, Frankfort-on-the-Main, Germany No Drawing. Application February 26, 1936, Serial No. 65,812. In Germany March 1, 1935

4 Claims. (Cl. 260—583)

The present invention relates to a process of producing halogen alkyl amines or their salts.

It has already been proposed to prepare the hydrochloride of chlorethyldiethylamine by the action of thionyl chloride on hydroxyethyldiethylamine. This reaction proceeds so violently, however, with the evolution of heat that appreciable results can only be obtained by employing a large excess of diluent, very strong cooling and by very slow mixing of the initial materials. The products obtained are, moreover, dark in color and contain greasy by-products in spite of the said precautions. Primary alkylolamines can only be converted in an unsatisfactory manner by the said process or not at all.

We have now found that the salts of halogen alkylamines can be prepared in a simple manner, while avoiding the said disadvantages, by causing the salts of hydroxyalkylamines to react with compounds capable of readily replacing hydroxy groups in organic compounds by halogen, especially with thionyl chloride or bromide. The hydroxyalkylamines, the salts of which are used, may contain, besides hydroxyalkyl groups, aliphatic, aromatic or aliphatic-aromatic groups; salts of heterocyclic amines containing hydroxyalkyl groups are also suitable. When the initial materials are mixed, only a slight evolution of heat takes place if at all. The reaction is preferably carried out while heating. It is usually completed after heating the mixture at from 40° to 50° C. for an hour. The reaction products are usually obtained in crystallized form, almost colorless and in practically quantitative yields. Dilution of the reaction mass by inert solvents is either quite unnecessary or only small amounts of solvent are required, so that waste of solvent is avoided completely.

The free bases may be obtained from the salts of the halogen alkylamines first formed, usually in a simple manner by the addition of alkali. By reason of their reactivity, the products obtained according to this invention are valuable intermediate products in a great variety of chemical fields.

The following examples will further illustrate the nature of this invention but the invention is not restricted to these examples. The parts are by weight.

Example 1

500 parts of thionyl chloride dissolved in 500 parts of chloroform are added to a suspension of 400 parts of ethanolamine hydrochloride in 500 parts of chloroform. The whole is heated at 50° C. until hydrogen chloride is no longer evolved. The originally solid salt is converted into a viscous mass which solidifies to a crystal pulp when cooled. After filtration by suction and drying, the hydrochloride of chlorethylamine is obtained in a practically theoretical amount.

Instead of ethanolamine hydrochloride the hydrochlorides of hydroxyethylaniline or of hexahydrohydroxyethylaniline may be employed.

Example 2

150 parts of thionyl chloride are allowed to flow into 100 parts of ethanolamine hydrochloride. A strong evolution of hydrogen chloride and sulphur dioxide sets in without spontaneous heating of the mass. When heated to from 50° to 60° C., the reaction mass becomes viscous. The slight excess of thionyl chloride is removed in vacuo and a pale colored crystalline powder remains behind.

Example 3

500 parts of thionyl chloride are allowed to drop at 40° C. into a suspension of 270 parts of diethanolamine hydrochloride in 400 parts of chloroform in such a manner that the reaction goes on vigorously. The mass is then heated for an hour at 50° C. After allowing the reaction mass to cool, dichlordiethylamine hydrochloride is obtained in a practically quantitative yield in the form of colorless crystals. By stirring with soda solution, dichlordiethylamine which is insoluble in water and which boils at from 130° to 140° C. is obtained therefrom.

Example 4

150 parts of diethylethanolamine hydrochloride are suspended in 300 parts of chloroform. A solution of 130 parts of thionyl chloride in 130 parts of chloroform is then added to the suspension. By heating to 50° C., dissolution takes place with the formation of a clear solution. By distilling off the chloroform, a colorless crystal powder which melts at from 198° to 200° C. is obtained in a good yield. By repeated crystallization, the melting point may be raised considerably. The free base, which boils at from 145° to 147° C., may be obtained from the hydrochloride by the addition of soda.

Instead of diethylethanolamine hydrochloride the hydrochlorides of hydroxyethylmorpholine or of hydroxyethylpiperidine may be employed.

Example 5

220 parts of ethanolamine sulphate, 250 parts of thionyl chloride and 450 parts of chloroform are heated to 60° C. After cooling and filtration, chlorethylamine sulphate is obtained in a good yield in the form of colorless crystals.

Example 6

150 parts of diethylethanolamine hydrochloride and 150 parts of thionyl chloride are heated at from 70° to 80° C. The excess of thionyl chloride is distilled off. Diethylchlorethylamine hydrochloride remains behind in a quantitative yield.

Example 7

223 parts of 2-hydroxy-1-aminopropane hydrochloride (or 1-hydroxy-3-aminopropane hydrochloride) are stirred with 500 parts of chloroform. Into this mixture, at from 40° to 50° C., 260 parts of thionyl chloride are allowed to flow at such a speed that the reaction remains vigorous. The whole is then heated for an hour at 50° C. After cooling, the 2-chlor-1-aminopropane hydrochloride is filtered off by suction. The yield is quantitative. The product forms colorless iridescent leaflets.

What we claim is:

1. The process for the production of salts of halogenalkyl amines, which comprises causing a salt of a hydroxyalkylamine containing from 1 to 2 hydroxyalkyl groups with an inorganic non-oxidizing acid to react with a thionyl halide.

2. The process for the production of salts of halogenalkyl amines, which comprises causing a salt of a hydroxyalkylamine containing from 1 to 2 hydroxyalkyl groups with an inorganic non-oxidizing acid to react with a thionyl halide in the absence of a diluent.

3. The process for the production of salts of chloralkyl amines, which comprises causing a salt of a hydroxyalkylamine containing from 1 to 2 hydroxyalkyl groups with an inorganic non-oxidizing acid to react with thionyl chloride.

4. The process for the production of salts of chloralkyl amines, which comprises causing a salt of a hydroxyalkylamine containing from 1 to 2 hydroxyalkyl groups with an inorganic non-oxidizing acid to react with thionyl chloride in the absence of a diluent.

HEINRICH ULRICH.
ERNST PLOETZ.
MAX BÖGEMANN.